US012494171B2

(12) United States Patent
Kim et al.

(10) Patent No.: US 12,494,171 B2

(45) Date of Patent: Dec. 9, 2025

(54) SUBPIXEL CIRCUIT, DISPLAY PANEL AND DISPLAY DEVICE

(71) Applicant: LG Display Co., Ltd., Seoul (KR)

(72) Inventors: Ji Ah Kim, Paju-si (KR); Joung Mi Choi, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/789,339

(22) Filed: Jul. 30, 2024

(65) Prior Publication Data

US 2025/0087157 A1 Mar. 13, 2025

(30) Foreign Application Priority Data

Sep. 7, 2023 (KR) ........................ 10-2023-0118949

(51) Int. Cl.
*G09G 3/3233* (2016.01)

(52) U.S. Cl.
CPC ... *G09G 3/3233* (2013.01); *G09G 2300/0819* (2013.01); *G09G 2300/0852* (2013.01); *G09G 2300/0861* (2013.01); *G09G 2310/08* (2013.01); *G09G 2320/0209* (2013.01); *G09G 2330/021* (2013.01)

(58) Field of Classification Search
None
See application file for complete search history.

(56) References Cited

U.S. PATENT DOCUMENTS 5,748,160 A * 5/1998 Shieh .................... G09G 3/3258 345/82
5,786,796 A * 7/1998 Takayama ............ G09G 3/3233 345/80
6,157,356 A * 12/2000 Troutman ............ G09G 3/2022 345/82
6,686,699 B2 * 2/2004 Yumoto ............... G09G 3/3241 315/169.3
7,071,932 B2 * 7/2006 Libsch ................. G09G 3/3233 345/82
7,271,785 B2 * 9/2007 Jang ...................... G09G 3/3258 345/80
8,525,759 B2 * 9/2013 Long ..................... G09G 3/3233 315/169.3
2006/0038762 A1 * 2/2006 Chou ...................... G09G 3/325 345/92
2009/0207105 A1 * 8/2009 Hwang ................ G09G 3/3233 345/76

(Continued)

*Primary Examiner* — Dorothy Harris

(74) *Attorney, Agent, or Firm* — Birch, Stewart, Kolasch & Birch, LLP

(57) ABSTRACT

A subpixel circuit and a display device including the subpixel circuit are discussed. The subpixel circuit in one example includes a light emitting element configured to receive a high-potential driving voltage at an anode electrode, and a driving transistor including a first node, a second node, and a third node. The subpixel circuit further includes a scan transistor controlled by a first scan signal and transmitting a data voltage through a data line, a storage capacitor, and a control circuit configured to control operations of the driving transistor, the scan transistor, and the storage capacitor. The control circuit can be located between a cathode electrode of the light emitting element and a low-potential base voltage line.

13 Claims, 9 Drawing Sheets

(56) References Cited

U.S. PATENT DOCUMENTS

| | | | | |
|---|---|---|---|---|
| 2010/0207920 | A1* | 8/2010 | Chaji | G09G 3/3233<br>345/76 |
| 2019/0295473 | A1* | 9/2019 | Lu | G09G 3/3233 |
| 2023/0178532 | A1* | 6/2023 | Ju | H10K 71/861<br>257/71 |
| 2024/0211080 | A1* | 6/2024 | Lee | G06F 3/0446 |
| 2024/0215325 | A1* | 6/2024 | Lee | H10K 59/122 |
| 2024/0221619 | A1* | 7/2024 | Lee | G09G 3/32 |
| 2024/0224648 | A1* | 7/2024 | Lee | H10K 59/122 |

* cited by examiner

SUBPIXEL CIRCUIT, DISPLAY PANEL AND DISPLAY DEVICE

CROSS REFERENCE TO RELATED APPLICATION

This application claims priority to Korean Patent Application No. 10-2023-0118949, filed in the Republic of Korea on Sep. 7, 2023, the entire contents of which is hereby expressly incorporated by reference into the present application.

BACKGROUND

Field

Embodiments of the present disclosure relate to a subpixel circuit, a display panel and a display device capable of stable operation.

Discussion of the Related Art

Representative display devices for displaying an image based on digital data include liquid crystal display (LCD) devices using liquid crystal and organic light emitting display devices using organic light emitting diodes (OLEDs).

Among the display devices, the active matrix type organic light emitting display device uses organic light emitting diodes that emit light on their own, and has the advantages of fast response speed, high emission efficiency, high luminance, and wide viewing angle.

The organic light emitting display device includes a driving transistor (thin film transistor) to control the driving current flowing through the organic light emitting diode. It is desirable that the electrical characteristics of the driving transistor, such as threshold voltage and mobility, are designed to be the same in all subpixels. However in reality, the electrical characteristics of the driving transistor for each subpixel are variable depending on process conditions, driving environment, etc. For this reason, the driving current based on the same data voltage can vary for each subpixel, resulting in luminance deviation between the subpixels.

To solve this problem, image quality compensation technology is used to reduce luminance deviation by sensing the electrical characteristics (threshold voltage, mobility) of the driving transistor from each subpixel and appropriately compensating the input data according to the sensing results.

An internal compensation method among the image quality compensation technologies controls a driving timing of the subpixel to exclude a variation of the electrical characteristics of the driving transistor while the organic light emitting diode emits light. The internal compensation method basically can increase a gate voltage of the driving transistor using a source follower scheme to perform a sampling operation that saturates it to a certain level.

During the process of internal compensation, the gate node and source node of the driving transistor become floating state, and the gate-source voltage of the driving transistor can be changed due to parasitic capacitance other than the storage capacitor, which can cause defects such as crosstalks.

SUMMARY OF THE DISCLOSURE

In this regard, the inventors of the present disclosure have invented a subpixel circuit, a display panel and a display device that enable a stable operation of the driving transistor during the internal compensation process.

Embodiments of the present disclosure can provide a subpixel circuit, a display panel and a display device that can stably maintain the source voltage of the driving transistor by connecting organic light emitting diodes with a common anode structure.

Additionally, embodiments of the present disclosure can provide a low-power subpixel circuit, a display panel and a display device that can reduce power consumption through a stable operation of the driving transistor.

According to embodiments, the present disclosure can provide a subpixel circuit including a light emitting element configured to receive a high-potential driving voltage at an anode electrode; a driving transistor including a first node, a second node and a third node; a scan transistor controlled by a first scan signal and configured to transmit a data voltage through a data line; a storage capacitor; and a control circuit configured to control operations of the driving transistor, the scan transistor, and the storage capacitor and located between a cathode electrode of the light emitting element and a low-potential base voltage line.

According to embodiments, the present disclosure can provide a display panel including a light emitting element configured to receive a high-potential driving voltage at an anode electrode; a driving transistor including a first node, a second node, and a third node; a scan transistor controlled by a first scan signal and configured to transmit a data voltage through a data line; a storage capacitor; and a control circuit configured to control operations of the driving transistor, the scan transistor, and the storage capacitor and located between a cathode electrode of the light emitting element and a low-potential base voltage line.

According to embodiments, the present disclosure can provide a display device comprising a display panel including a plurality of subpixels, a gate driving circuit configured to supply a plurality of gate signals to the display panel through a plurality of gate lines, a data driving circuit configured to supply a plurality of data voltages to the display panel through a plurality of data lines, and a timing controller configured to control the gate driving circuit and the data driving circuit, wherein each of the plurality of subpixels includes a light emitting element configured to receive a high-potential driving voltage at an anode electrode, a driving transistor including a first node, a second node, and a third node, a scan transistor controlled by a first scan signal and configured to transmit a data voltage through a corresponding data line, a storage capacitor, and a control circuit configured to control operations of the driving transistor, the scan transistor, and the storage capacitor and located between a cathode electrode of the light emitting element and a low-potential base voltage line.

According to embodiments of the disclosure, it is possible to stably operate the driving transistor during the internal compensation process.

According to embodiments of the disclosure, it is possible to stably maintain the source voltage of the driving transistor by connecting organic light emitting diodes with a common anode structure.

According to embodiments of the disclosure, it is possible to implement a low-power operation by reducing power consumption through stable operation of the driving transistor.

BRIEF DESCRIPTION OF THE DRAWINGS

The above and other objectives, features, and advantages of the present disclosure will be more clearly understood from the following detailed description, taken in conjunction with the accompanying drawings, in which.

DETAILED DESCRIPTION OF THE EMBODIMENTS

Figure 1:
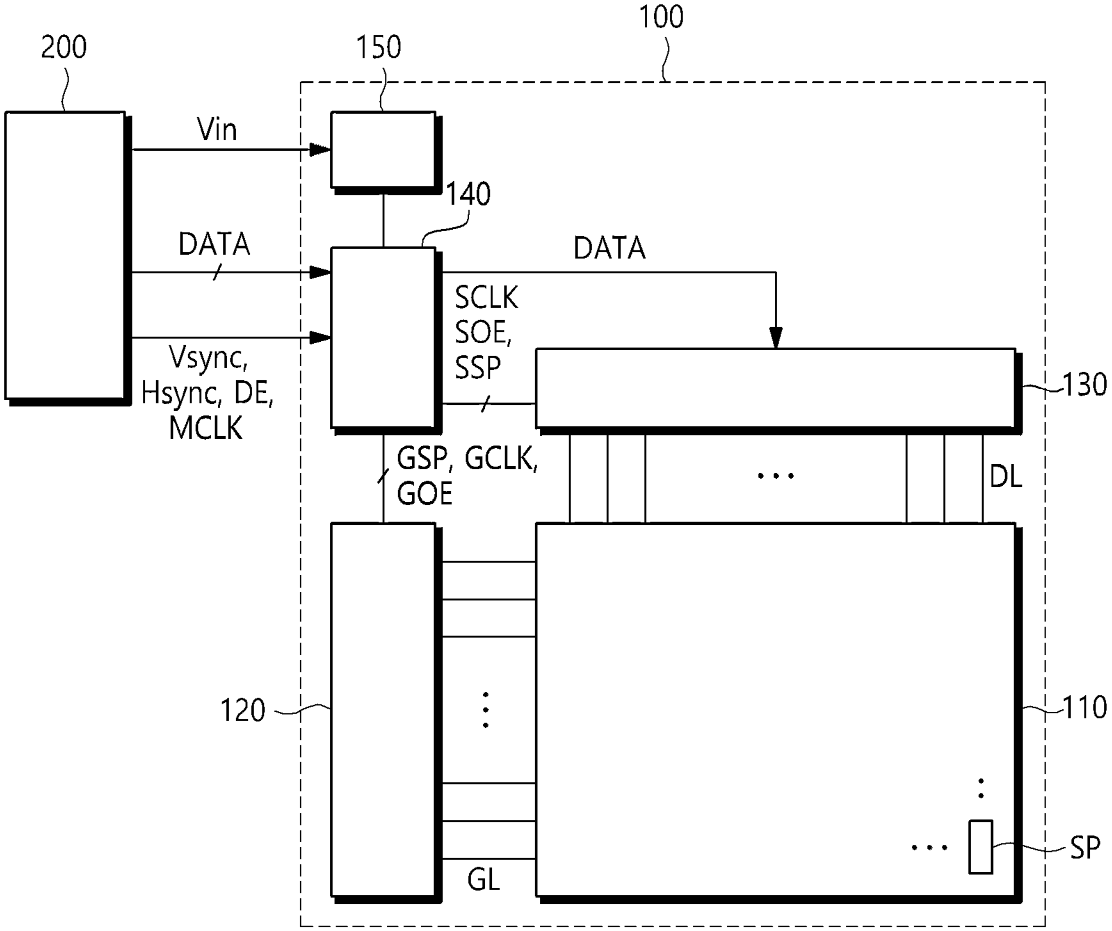
FIG. 1 is a view schematically illustrating a configuration of a display device according to embodiments of the present disclosure.

Hereinafter, some embodiments of the present disclosure will be described in detail with reference to exemplary drawings. In the following description of examples or embodiments of the present invention, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present invention, detailed descriptions of well-known functions and components incorporated herein will be omitted when it is determined that the description can make the subject matter in some embodiments of the present invention rather unclear. The terms such as “including”, “having”, “containing”, “constituting”, “made up of”, and “formed of” used herein are generally intended to allow other components to be added unless the terms are used with the term “only”. As used herein, singular forms are intended to include plural forms unless the context clearly indicates otherwise.

Terms, such as “first”, “second”, “A”, “B”, “(A)”, or “(B)” can be used herein to describe elements of the present invention. Each of these terms is not used to define essence, order, sequence, or number of elements etc., but is used merely to distinguish the corresponding element from other elements.

When it is mentioned that a first element “is connected or coupled to”, “contacts or overlaps” etc. a second element, it should be interpreted that, not only can the first element “be directly connected or coupled to” or “directly contact or overlap” the second element, but a third element can also be “interposed” between the first and second elements, or the first and second elements can “be connected or coupled to”, “contact or overlap”, etc. each other via a fourth element. Here, the second element can be included in at least one of two or more elements that “are connected or coupled to”, “contact or overlap”, etc. each other.

When time relative terms, such as “after”, “subsequent to”, “next”, “before”, and the like, are used to describe processes or operations of elements or configurations, or flows or steps in operating, processing, manufacturing methods, these terms can be used to describe non-consecutive or non-sequential processes or operations unless the term “directly” or “immediately” is used together.

In addition, when any dimensions, relative sizes etc. are mentioned, it should be considered that numerical values for an elements or features, or corresponding information (e.g., level, range, etc.) include a tolerance or error range that can be caused by various factors (e.g., process factors, internal or external impact, noise, etc.) even when a relevant description is not specified. Further, the term “may” fully encompasses all the meanings of the term “can”.

Hereinafter, various embodiments of the present disclosure will be described in detail with reference to the accompanying drawings. All the components of each display device according to all embodiments of the present disclosure are operatively coupled and configured.

FIG. 1 is a view schematically illustrating a configuration of a display device according to embodiments of the present disclosure.

Referring to FIG. 1, a display device 100 according to embodiments of the disclosure can include a display panel 110 where a plurality of gate lines GL and data lines DL are connected, and a plurality of subpixels SP are arranged in a matrix form, a gate driving circuit 120 for driving the plurality of gate lines GL, a data driving circuit 130 for supplying a data voltage through the plurality of data lines DL, a timing controller 140 for controlling the gate driving circuit 120 and the data driving circuit 130, and a power management circuit 150.

The display panel 110 displays an image based on a scan signal transferred from the gate driving circuit 120 through the plurality of gate line GL and the data voltage transferred from the data driving circuit 130 through the plurality of data lines DL.

In the case of a liquid crystal display, the display panel 110 can include a liquid crystal layer formed between two substrates and can be operated in any known mode, such as a twisted nematic (TN) mode, a vertical alignment (VA) mode, an in-plane switching (IPS) mode, or a fringe field switching (FFS) mode. In the case of an organic light emitting display, the display panel 110 can be implemented in a top emission scheme, a bottom emission scheme, or a dual-emission scheme.

In the display panel 110, a plurality of pixels can be arranged in a matrix form, and each pixel can include subpixels SP having different colors, e.g., a white subpixel, a red subpixel, a green subpixel, and a blue subpixel, and each subpixel SP can be defined by the plurality of data lines DL and the plurality of gate lines GL.

Each subpixel SP can include, e.g., a thin film transistor (TFT) formed at the intersection between one data line DL and one gate line GL, a light emitting element, such as an organic light emitting diode, charged with the data voltage, and a storage capacitor electrically connected to the light emitting element to maintain the voltage.

For example, when the display device 100 having a resolution of 2,160×3,840 includes four subpixels SP of white (W), red (R), green (G), and blue (B), 3,840 data lines DL can be connected to 2,160 gate lines GL and four subpixels WRGB. Thus, there can be provided 3,840×4=15,360 data lines DL. Each subpixel SP is disposed at the intersection between the corresponding gate line GL and the corresponding data line DL.

The gate driving circuit 120 can be controlled by the controller 140 to sequentially output scan signals to the plurality of gate lines GL disposed in the display panel 110, controlling the driving timing of the plurality of subpixels SP.

Depending on the case, the gate driving circuit 120 can output a scan signal that controls the driving timing of the subpixel SP and an emission signal that controls the emission timing of the subpixel SP. In this case, the gate signal output from the gate driving circuit 120 can include a scan signal and an emission signal. The circuit that outputs the scan signal and the circuit that outputs the emission signal can be implemented as separate circuits or as one circuit.

In the display device 100 having a resolution of 2,160×3,840, sequentially outputting the scan signal to the 2,160 gate lines GL from the first gate line to the 2,160th gate line can be referred to as 2,160-phase driving. Sequentially outputting the scan signal to each unit of four gate lines GL, e.g., sequentially outputting the scan signal to the fifth gate line to the eighth gate line after sequentially outputting the scan signal to the first gate line to the fourth gate line, is referred to as 4-phase driving. In other words, sequentially outputting the scan signal to every N gate lines GL can be referred to as N-phase driving.

The gate driving circuit 120 can include one or more gate driving integrated circuits (GDICs). Depending on driving schemes, the gate driving circuit 120 can be positioned on only one side, or each of two opposite sides, of the display panel 110. The gate driving circuit 120 can be implemented in a gate-in-panel (GIP) form which is embedded in the bezel area of the display panel 110.

The data driving circuit 130 receives image data DATA from the timing controller 140 and converts the received image data DATA into an analog data voltage. Then, as the data voltage is output to each data line DL according to the timing when the scan signal is applied through the gate line GL, each subpixel SP connected to the data line DL displays an image having the brightness corresponding to the data voltage.

Likewise, the data driving circuit 130 can include one or more source driving integrated circuits SDIC, and the source driving integrated circuit SDIC can be connected to the bonding pad of the display panel 110 in a tape automated bonding (TAB) type or a chip-on-glass (COG) type or can be disposed directly on the display panel 110.

In some cases, each source driving integrated circuit SDIC can be integrated and disposed on the display panel 110. Further, each source driving integrated circuit SDIC can be implemented in a chip-on-film (COF) type and, in this case, each source driving integrated circuit SDIC can be mounted on a circuit film and can be electrically connected to the data line DL of the display panel 110 through the circuit film.

The timing controller 140 supplies various control signals to the gate driving circuit 120 and the data driving circuit 130 and controls the operation of the gate driving circuit 120 and the data driving circuit 130. In other words, the timing controller 140 can control the gate driving circuit 120 to output a scan signal according to the timing implemented in each frame and, on the other hand, transfers the image data DATA received from the outside to the data driving circuit 130.

In this case, the timing controller 140 receives, from an external host system 200, several timing signals including, e.g., a vertical synchronization signal Vsync, a horizontal synchronization signal Hsync, a data enable signal DE, and a main clock MCLK, together with the image data DATA.

The host system 200 can be any one of a television (TV) system, a set-top box, a navigation system, a personal computer (PC), a home theater system, a mobile device, and a wearable device, but is not limited thereto.

Accordingly, the timing controller 140 can generate a control signal according to various timing signals received from the host system 200 and transfers the control signal to the gate driving circuit 120 and the data driving circuit 130.

For example, the timing controller 140 outputs several gate control signals including, e.g., a gate start pulse GSP, a gate clock GCLK, and a gate output enable signal GOE, to control the gate driving circuit 120. The gate start pulse GSP controls the timing at which one or more gate driving integrated circuits GDIC constituting the gate driving circuit 120 start operation. The gate clock GCLK is a clock signal commonly input to one or more gate driving integrated circuits GDIC and controls the shift timing of the scan signal. The gate output enable signal GOE designates timing information about one or more gate driving integrated circuits GDICs.

The timing controller 140 outputs various data control signals including, e.g., a source start pulse SSP, a source sampling clock SCLK, and a source output enable signal SOE, to control the data driving circuit 130. The source start pulse SSP controls the timing at which one or more source driving integrated circuits SDIC constituting the data driving circuit 130 start data sampling. The source clock SCLK is a clock signal that controls the timing of sampling data in the source driving integrated circuit SDIC. The source output enable signal SOE controls the output timing of the data driving circuit 130.

The display device 100 can further include a power management circuit 150 that supplies various voltages or currents to, e.g., the display panel 110, the gate driving circuit 120, and the data driving circuit 130 or controls various voltages or currents to be supplied.

The power management circuit 150 adjusts the direct current (DC) input voltage Vin supplied from the host system 200, generating power required or needed to drive the display panel 100, the gate driving circuit 120, and the data driving circuit 130.

The subpixel SP is positioned at the intersection between the gate line GL and the data line DL, and a light emitting element can be disposed in each subpixel SP. For example, the organic light emitting diode display can include a light emitting element, such as an organic light emitting diode, in each subpixel SP and can display an image by controlling the current flowing to the light emitting element according to the data voltage.

The display device 100 can be one of various types of devices, such as liquid crystal displays, organic light emitting diode displays, or plasma display panels, but is not limited thereto.

Figure 2:
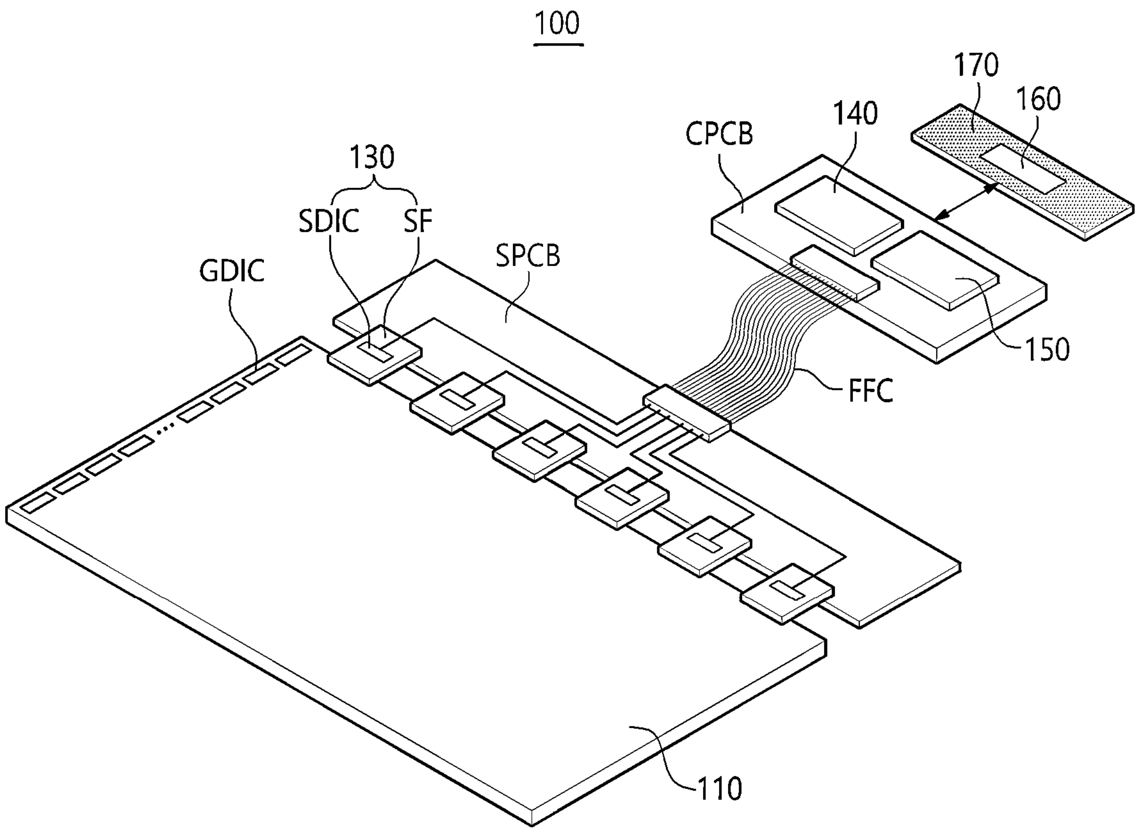
FIG. 2 is a diagram illustrating a system of the display device according to embodiments of the present disclosure.

FIG. 2 is a diagram illustrating a system of the display device according to embodiments of the present disclosure.

Referring to FIG. 2, the display device 100 according to embodiments of the present disclosure can include a plurality of source driving integrated circuit SDIC implemented using a COF structure from among a variety of structures such as TAB, COG, and COF structures in the data driving circuit 130, and the gate driving circuit 120 implemented using a GIP structure from among a variety of structures such as TAB, COG, COF, and GIP structures.

When the gate driving circuit 120 has the GIP structure, the plurality of gate driving integrated circuits GDIC of the gate driving circuit 120 can be directly formed in the bezel area of the display panel 110. Here, the gate driving integrated circuits GDIC can be provided with a variety of signals (e.g., a clock, a gate high signal, and a gate low signal) required or needed for generation of scan signals through gate driving-related signal lines disposed in the bezel area.

In the same manner, the source driving integrated circuits SDIC of the data driving circuit 130 can be mounted on source films SF, respectively. One side of each of the source films SF can be electrically connected to the display panel 110. In addition, conductive lines electrically connecting the source driving integrated circuits SDIC to the display panel 110 can be disposed on the top portions of the source films SF.

The display device 100 can include at least one source printed circuit board SPCB and a control printed circuit board CPCB for circuit connection of the plurality of source driving integrated circuits SDIC to other devices. Here, control components and a variety of electrical devices can be mounted on the control printed circuit board CPCB.

Here, the other sides of the source films SF on which the source driving integrated circuits SDIC are mounted can be connected to the source printed circuit board SPCB. That is, each of the source films SF on which the source driving integrated circuits SDIC are mounted can be configured such that one side thereof is electrically connected to the display panel 110 and the other side thereof is electrically connected to the source printed circuit board SPCB.

The timing controller 140 and a power management circuit 150 can be mounted on the control printed circuit board CPCB. The timing controller 140 can control the operation of the data driving circuit 130 and the gate driving circuit 120. The power management circuit 150 can supply a driving voltage or current to the display panel 110, the data driving circuit 130, the gate driving circuit 120, and the like and can control the supplied voltage or current.

The source printed circuit board SPCB and the control printed circuit board CPCB can be circuit-connected to each other through at least one connecting member. The connecting member can be, for example, a flexible flat cable FFC, a flexible printed circuit (FPC), or the like. In addition, the source printed circuit board SPCB and the control printed circuit board CPCB can be integrated into a single printed circuit board (PCB).

The display device 100 can further include a set board 170 electrically connected to the control printed circuit board CPCB. Here, the set board 170 can also be referred to as a power board. The set board 170 can be provided with a main power management circuit 160 to manage the overall power of the display device 100. The main power management circuit 160 can work in concert with the power management circuit 150.

In the display device 100 having the above-described configuration, a driving voltage is generated by the set board 170 and is transferred to the power management circuit 150 in the control printed circuit board CPCB. The power management circuit 150 transfers the driving voltage, required or needed for display driving or characteristic value sensing, to the source printed circuit board SPCB through the flexible printed circuit or the flexible flat cable FFC. The driving voltage transferred to the source printed circuit board SPCB is supplied through the source driving integrated circuits SDIC in order to light or sense a specific subpixel SP in the display panel 110.

Here, each of the subpixels SP arrayed in the display panel 110 of the display device 100 can include a light-emitting element and circuit elements, such as a driving transistor, for driving the light-emitting element.

The type and number of the circuit elements provided in each of the subpixels SP can be determined variously depending on functions to be provided, designs, and the like.

Figure 3:
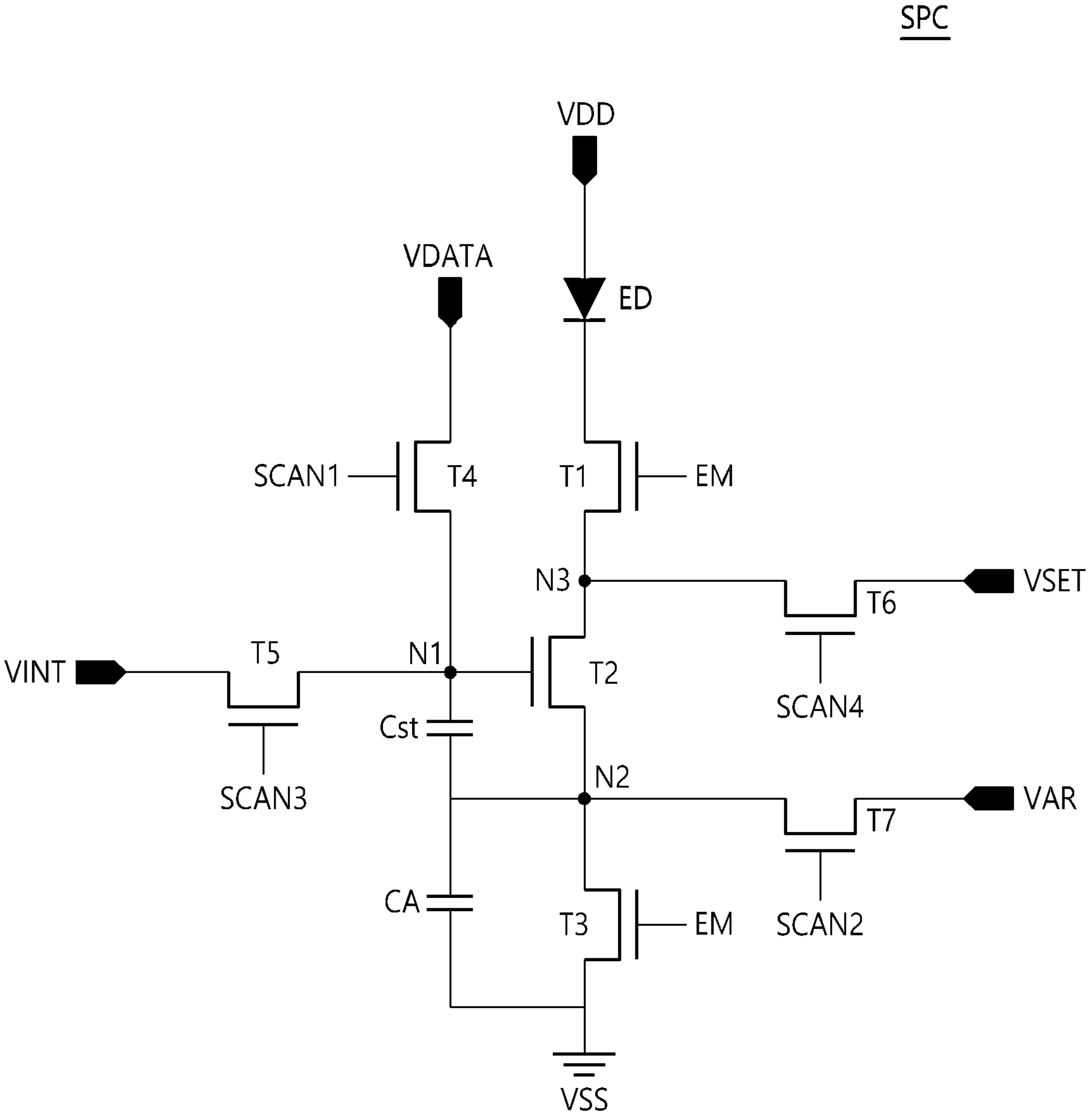
FIG. 3 is a diagram illustrating a subpixel circuit of a display device according to embodiments of the present disclosure.

FIG. 3 is a diagram illustrating a subpixel circuit of a display device according to embodiments of the present disclosure.

Referring to FIG. 3, the subpixel circuit SPC of the display device 100 according to embodiments of the present disclosure can include a light emitting element ED, a plurality of transistors T1-T7 for driving the light emitting element ED and a plurality of capacitors Cst, CA. Each subpixel circuit SPC of the display device 100 can have the configuration of FIG. 3.

Here, a 7T2C subpixel SP consisting of (or including) seven transistors T1-T7 and two capacitors Cst, CA is shown as an example, but the circuit elements placed in the subpixel SP can be implemented in various ways depending on the type of the display device 100. In addition, it illustrates a case where the transistors T1-T7 disposed in the subpixel SP are N-type transistors, but in some cases, the subpixel SP can be composed of a P-type transistor.

When the subpixel SP is composed of P-type transistors, the scan signals SCAN1, SCAN2, SCAN3, SCAN4 can have the opposite polarity as when the subpixel SP is composed of N-type transistors.

When the subpixel SP is configured as 7T2C, each subpixel SP can include seven transistors T1-T7 and two capacitors Cst, CA.

The subpixel SP of the present disclosure can be configured so that a high-potential driving voltage VDD is commonly supplied to the anode electrode of the light emitting element ED for stable operation of the driving transistor.

The high-potential driving voltage VDD is supplied to the anode electrode of the light emitting element ED, and the cathode electrode of the light emitting element ED is electrically connected to a first transistor T1. For example, the light emitting element ED can be an organic light emitting diode OLED.

The first transistor T1 can be controlled by an emission signal EM, and can be electrically connected between the cathode electrode of the light emitting element ED and a second transistor T2. The first transistor T1 can also be called a light emitting transistor.

The second transistor T2 can have a first node N1, a second node N2, and a third node N3. The first node N1 can be a gate node and can be electrically connected to a fourth transistor T4 and a fifth transistor T5. The second node N2 can be a drain node or a source node, and can receive a low-potential base voltage VSS supplied through a third transistor T3. The third node N3 can be a source node or a drain node, and can be electrically connected to the cathode electrode of the light emitting element ED through the first transistor T1. This second transistor T2 can also be called a driving transistor.

The third transistor T3 can be controlled by the emission signal EM, and can be electrically connected between the second node N2 and the low-potential base voltage VSS (e.g., between the second node N2 and a line that provides the low-potential base voltage VSS). The line that provides the low-potential base voltage VSS can be any entity or part that provides the voltage VSS. This third transistor T3 can also be called a light emitting transistor. Therefore, here, the first transistor T1 and the third transistor T3 can correspond to light emitting transistors.

The fourth transistor T4 can be controlled by a first scan signal SCAN1 and can be electrically connected between a line for supplying the data voltage VDATA and the first node N1 of the second transistor T2. This fourth transistor T4 can also be called a scan transistor.

The fifth transistor T5 can be controlled by a third scan signal SCAN3, and can be electrically connected between a node for supplying a gate initialization voltage VINIT and the first node N1 of the second transistor T2. This fifth transistor T5 can also be called an initialization transistor.

The sixth transistor T6 can be controlled by a fourth scan signal SCAN4, and can be electrically connected between a node for supplying a setting voltage VSET and the third node N3 of the second transistor T2. This sixth transistor T6 can also be referred to as a setting transistor.

The seventh transistor T7 can be controlled by the second scan signal SCAN2, and can be electrically connected between a node for supplying a reset voltage VAR and the second node N2 of the second transistor T2. This seventh transistor T7 can also be called a reset transistor.

However, the second scan signal SCAN2 supplied to the seventh transistor T7 can be the same signal with a different phase from the fourth scan signal SCAN4 supplied to the sixth transistor T6. For example, when the fourth scan signal SCAN4 is supplied to the nth gate line, the second scan signal SCAN2 can use the fourth scan signal SCAN4 supplied to the (n−1) th gate line. That is, the second scan signal SCAN2 can use the fourth scan signal SCAN4 at different gate line GL depending on the phase at which the display panel 110 is driven.

A storage capacitor Cst can be electrically connected between the first node N1 and the second node N2 of the second transistor T2, and can maintain the data voltage VDATA for one frame.

An auxiliary capacitor CA can be connected between the second node N2 of the second transistor T2 and the low-potential base voltage VSS line, and can have a function to maintain the voltage supplied to the second node N2. The auxiliary capacitor CA can be connected to the second node N2 and can increase the efficiency of the voltage supplied to the second node N2 of the second transistor T2 operating as a source follower.

The transistors T1-T7 composing of the subpixel SP can be P-type transistors or N-type transistors or combinations thereof.

The P-type transistors are relatively more reliable than N-type transistors. In the case of a P-type transistor, the driving transistor T2 can be fixed to a high-potential driving voltage VDD in the period where the light emitting element ED emits light, so the current flowing through the light emitting element ED can be supplied stably without fluctuation.

When operating in the saturation period, the P-type transistor can pass a constant current regardless of changes in the threshold voltage, so it has a relatively high reliability.

On the other hand, because N-type transistors use electrons rather than holes as carriers, they have faster mobility than P-type transistors, which can increase switching speed.

The N-type transistor can be an oxide transistor formed using an oxide semiconductor (e.g., a transistor with a channel formed from an oxide semiconductor such as indium, gallium, zinc oxide, or IGZO). The P-type transistor can be a silicon transistor formed using a silicon semiconductor (e.g., a transistor with a poly-silicon channel formed using a low-temperature process referred to as LTPS or low-temperature poly-silicon).

In the display device 100 of the present disclosure, when the subpixel circuit SPC is configured so that the high-potential driving voltage VDD is commonly supplied to the anode electrode of the light emitting element ED, all of the transistors T1-T7 constituting the subpixel SP can be N-type transistors, or at least the second transistor T2 corresponding to the driving transistor can be an N-type transistor for stable operation.

Here, it illustrates the case where the transistors T1-T7 constituting the subpixel SP are N-type transistors.

Additionally, the terminology for the source node and drain node of a transistor can change depending on a polarity of the input voltage.

Figure 4:
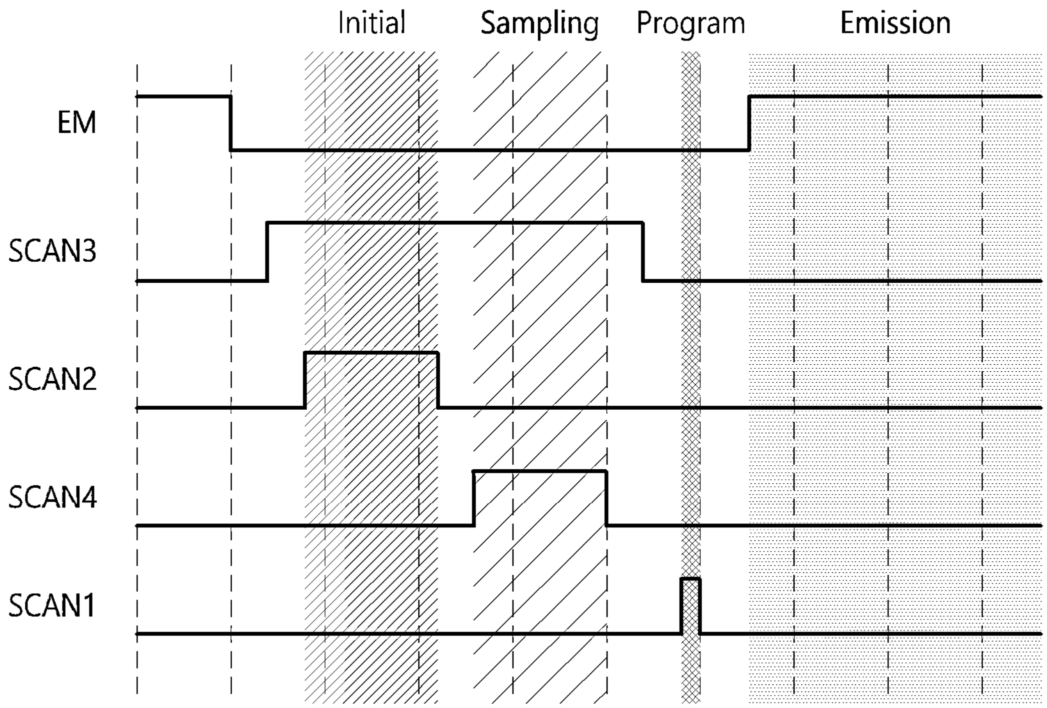
FIG. 4 is a diagram illustrating the driving timing of the subpixel according to embodiments of the present disclosure.
Figure 5:
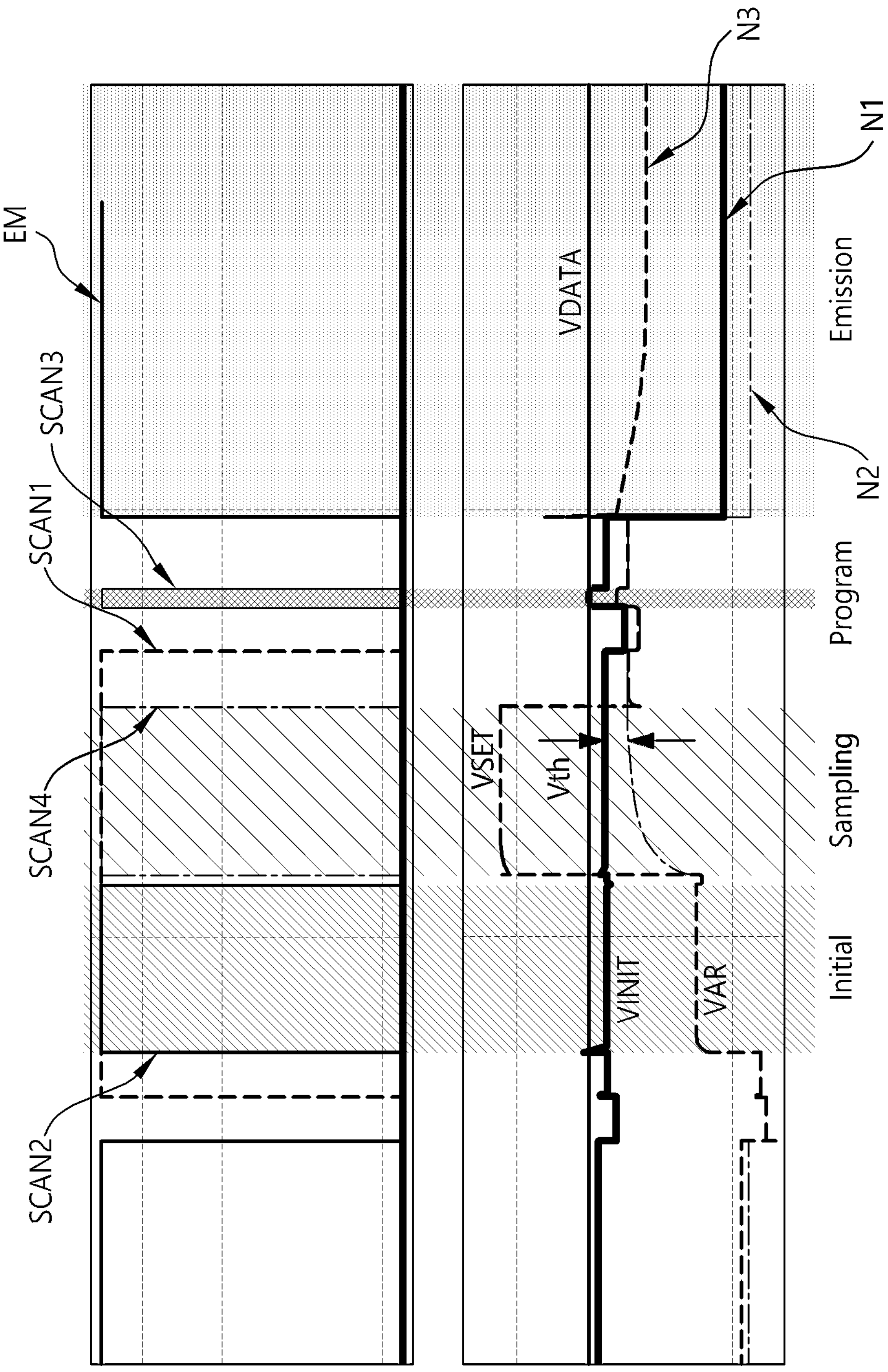
FIG. 5 is a diagram illustrating signal waveforms in nodes of the driving transistor depending on the driving timing of the subpixel according to the embodiments of the present disclosure.

FIG. 4 is a diagram illustrating the driving timing of the subpixel according to embodiments of the present disclosure, and FIG. 5 is a diagram illustrating signal waveforms in nodes of the driving transistor depending on the driving timing of the subpixel according to the embodiments of the present disclosure.

Referring to FIGS. 4 and 5, subpixels of the display device according to embodiments of the present disclosure can operate with an initialization period Initial, a sampling period Sampling, a programming period Program, and an emission period Emission.

The initialization period Initial is a period in which the data voltage supplied to the light emitting element ED is reset by supplying the reset voltage VAR to the subpixel SP. The sampling period Sampling is a period in which the threshold voltage of the driving transistor T2 is stored in the capacitor connected to the driving transistor T2. The programming period Program is a period in which the data voltage VDATA is stored in the capacitor connected to the driving transistor T2 by supplying the data voltage VDATA to the subpixel SP.

Although the sampling period Sampling is distinct from the programming period Program, the sampling period Sampling and programming period Program can be operated sequentially or simultaneously depending on the subpixel structure. In the subpixel structure described in the embodiment of the present disclosure, it illustrates the case where the sampling period Sampling and the programming period Program proceed sequentially.

The emission period Emission is a period in which the data voltage VDATA are not supplied through the data lines connected to each of the light emitting elements ED, and the data voltage VDATA stored in the capacitor is used to emit the light emitting elements ED.

During the initialization period Initial, the third scan signal SCAN3 and the second scan signal SCAN2 are supplied at a high level, so the fifth transistor T5 and the seventh transistor T7 are turned on.

Accordingly, the gate node of the second transistor T2 corresponding to the driving transistor can be initialized to the gate initialization voltage VINIT, and the second node N2 of the second transistor T2 can be reset to the reset voltage VAR.

During the initialization period Initial, the emission signal EM, the first scan signal SCAN1, and the fourth scan signal SCAN4 are supplied at a low level, so the first transistor T1, the third transistor T3, the fourth transistor T4 and the sixth transistor T6 are turned off.

Therefore, the gate initialization voltage VINIT and the reset voltage VAR can be supplied to both ends of the storage capacitor Cst, and the reset voltage VAR and low-potential base voltage VSS can be supplied to both ends of the auxiliary capacitor CA.

During the sampling period Sampling, the third scan signal SCAN3 is supplied at a high level, the second scan signal SCAN2 is supplied at a low level, and the fourth scan signal SCAN4 is applied at a high level.

Accordingly, the first node N1 of the second transistor T2 maintains the gate initialization voltage VINIT, and the third node N3 of the second transistor T2 receives the setting voltage VSET.

At this time, because the seventh transistor T7 is turned off, the second node N2 of the second transistor T2 can have a difference voltage (VINIT−Vth) corresponding to a difference between the gate initialization voltage VINIT and the threshold voltage Vth of the second transistor T2. Accordingly, the driving current flowing through the light emitting element ED by the second transistor T2 is not affected by the threshold voltage Vth. That is, compensation for the threshold voltage Vth of the second transistor T2 is accomplished.

In other words, during the sampling period Sampling, the subpixel performs a sampling operation to saturate the second transistor T2 to a certain level by increasing the voltage of the second node N2 of the second transistor T2, which is a driving transistor, in a source follower manner.

During the programming period Program, the third scan signal SCAN3, the second scan signal SCAN2, and the fourth scan signal SCAN4 are supplied at a low level, and the first scan signal SCAN1 is supplied at a high level.

Accordingly, the data voltage VDATA supplied to the first node N1 of the second transistor T2 is charged to the storage capacitor Cst and the auxiliary capacitor CA.

In addition, the difference voltage (VINIT−Vth) between the gate initialization voltage VINIT and the threshold voltage Vth of the second transistor T2 is added to the charged voltage a*(VDATA−VINIT) at the storage capacitor Cst in the second node N2 of the second transistor T2. Here, a=Cst/(Cst+CA).

During the emission period Emission, the first scan signal SCAN1 to the fourth scan signal SCAN4 are maintained at a low level, and the emission signal EM is supplied at a high level.

Accordingly, the corresponding subpixel SP emits light by the driving current flowing from the high-potential driving voltage VDD to the low-potential base voltage VSS through the light emitting element ED.

At this time, since a low-potential base voltage VSS is supplied to the second node N2 of the second transistor T2 corresponding to the driving transistor during the emission period Emission, the second transistor T2 can have a stable state. As a result, the gate-source voltage of the second transistor T2 can be prevented from changing due to parasitic capacitance, and image defects such as crosstalk can be reduced.

Meanwhile, the subpixel circuit of the present disclosure can achieve the same effect by supplying the same scan signal to some transistors. In this way, when the same scan signal is supplied to some transistors, the number of gate lines can be reduced and the structure of the gate driving circuit can be minimized, which has the effect of slimming the bezel area.

Figure 6:
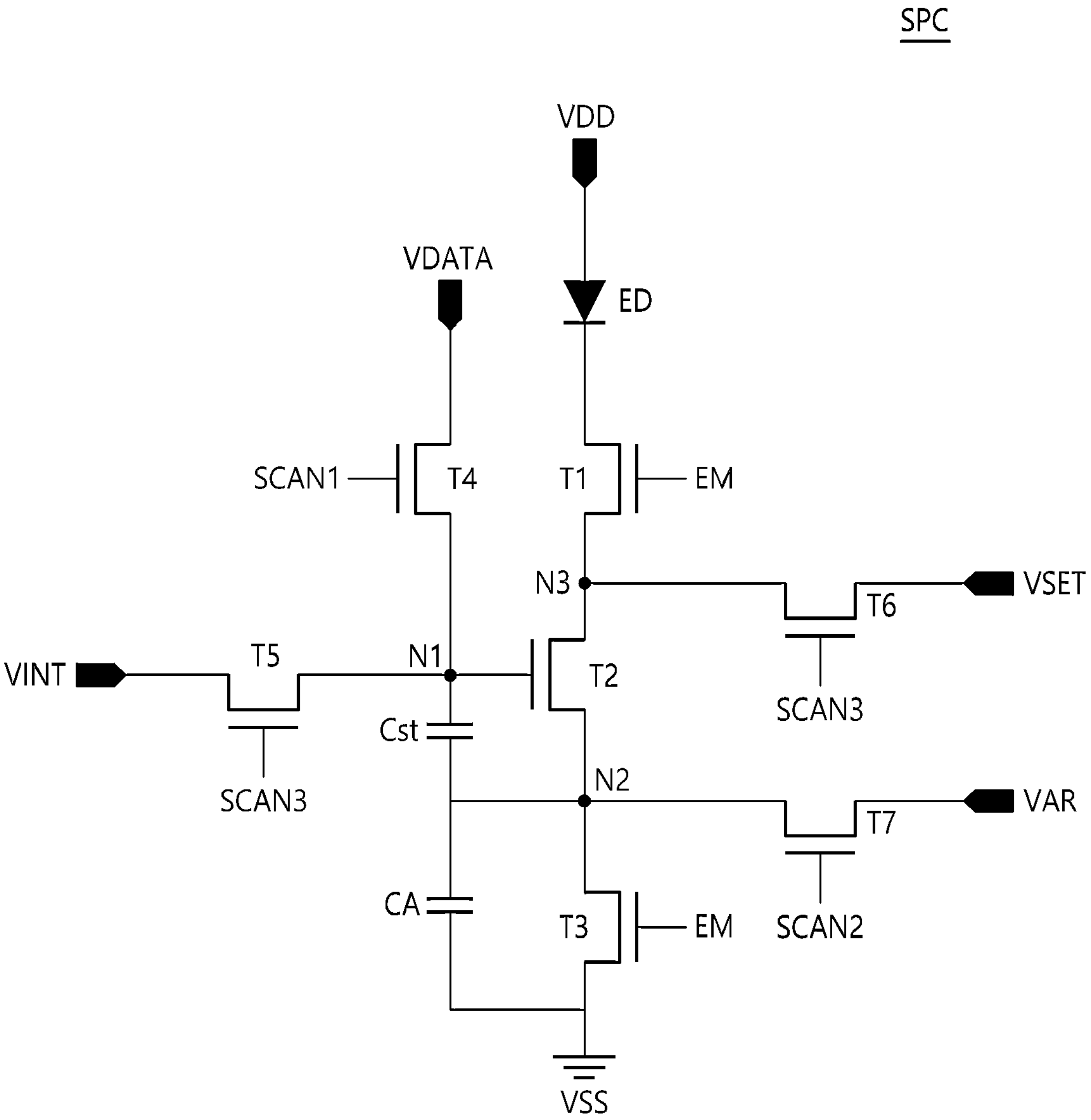
FIG. 6 is a diagram illustrating a subpixel circuit of a display device according to another embodiment of the present disclosure.

FIG. 6 is a diagram illustrating a subpixel circuit of a display device according to another embodiment of the present disclosure.

Referring to FIG. 6, the subpixel circuit SPC of the display device 100 according to embodiments of the present disclosure can include a light emitting element ED, a plurality of transistors T1-T7 for driving the light emitting element ED, and a plurality of capacitors Cst, CA. Each subpixel circuit SPC of the display device 100 can have the configuration of FIG. 6.

The difference between the subpixel of FIG. 6 and the subpixel of FIG. 3 is that the fifth transistor T5 for supplying the gate initialization voltage VINIT to the first node N1 of the second transistor T2 corresponding to the driving transistor and the sixth transistor T6 for supplying the setting voltage VSET to the third node N3 of the second transistor T2 are controlled by the same third scan signal SCAN3.

The subpixel SP of the present disclosure can be configured for a stable operation of the driving transistor so that a high-potential driving voltage VDD is commonly supplied to the anode electrode of the light emitting element ED.

The high-potential driving voltage VDD is supplied to the anode electrode of the light emitting element ED, and the cathode electrode of it is electrically connected to the first transistor T1.

The first transistor T1 can be controlled by an emission signal EM, and can be electrically connected between the cathode electrode of the light emitting element ED and a second transistor T2.

The second transistor T2 can have a first node N1, a second node N2, and a third node N3. The first node N1 can be a gate node and can be electrically connected to a fourth transistor T4 and a fifth transistor T5. The second node N2 can be a drain node or a source node, and can receive a low-potential base voltage VSS supplied through a third transistor T3. The third node N3 can be a source node or a drain node, and can be electrically connected to the cathode electrode of the light emitting element ED through the first transistor T1. This second transistor T2 can also be called a driving transistor.

The third transistor T3 can be controlled by the emission signal EM, and can be electrically connected between the second node N2 and the low-potential base voltage VSS line.

The fourth transistor T4 can be controlled by a first scan signal SCAN1 and can be electrically connected between a line for supplying the data voltage VDATA and the first node N1 of the second transistor T2.

The fifth transistor T5 can be controlled by a third scan signal SCAN3, and can be electrically connected between a node for supplying a gate initialization voltage VINIT and the first node N1 of the second transistor T2.

The sixth transistor T6 can be controlled by a third scan signal SCAN3, and can be electrically connected between a node for supplying a setting voltage VSET and the third node N3 of the second transistor T2.

The seventh transistor T7 can be controlled by the second scan signal SCAN2, and can be electrically connected between a node for supplying a reset voltage VAR and the second node N2 of the second transistor T2.

However, the second scan signal SCAN2 supplied to the seventh transistor T7 can be the same signal with a different phase from the third scan signal SCAN3 supplied to the sixth transistor T6. For example, when the third scan signal SCAN3 is supplied to the nth gate line, the second scan signal SCAN2 can use the third scan signal SCAN3 supplied to the (n−1)th gate line. That is, the second scan signal SCAN2 can use the third scan signal SCAN3 at different gate line GL depending on the phase at which the display panel 110 is driven.

Therefore, the subpixel SP of the present disclosure can be controlled by the first to third scan signals SCAN1-SCAN3.

A storage capacitor Cst can be electrically connected between the first node N1 and the second node N2 of the second transistor T2, and can maintain the data voltage VDATA for one frame.

An auxiliary capacitor CA can be connected between the second node N2 of the second transistor T2 and the low-potential base voltage VSS line, and can have a function to maintain the voltage supplied to the second node N2. The auxiliary capacitor CA can be connected to the second node N2 and can increase the efficiency of the voltage supplied to the second node N2 of the second transistor T2 operating as a source follower.

Here, it illustrates the case where the transistors T1-T7 constituting the subpixel are N-type transistors as an example.

Figure 7:
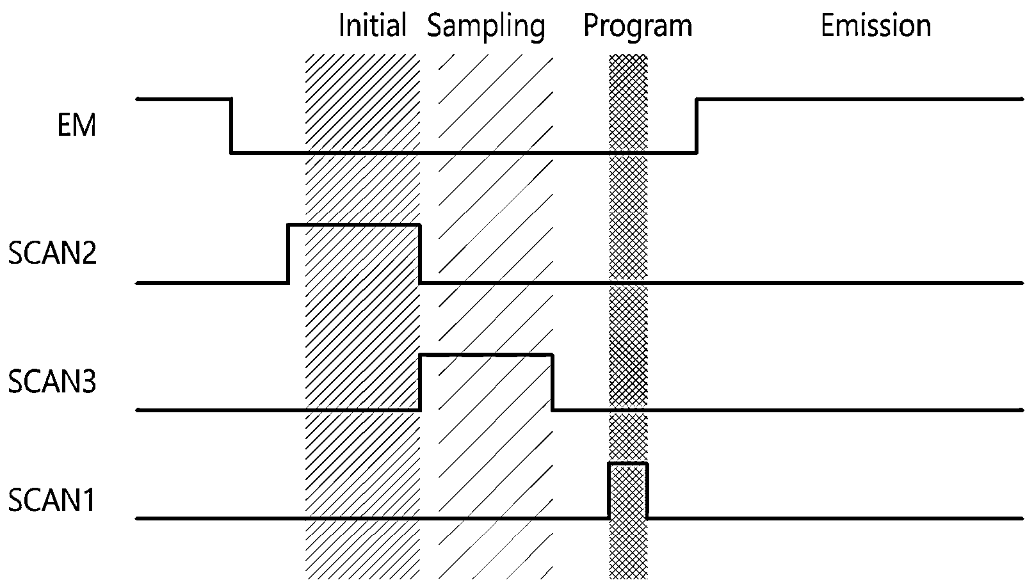
FIG. 7 is a diagram illustrating the driving timing of the subpixel according to another embodiment of the present disclosure.
Figure 8:
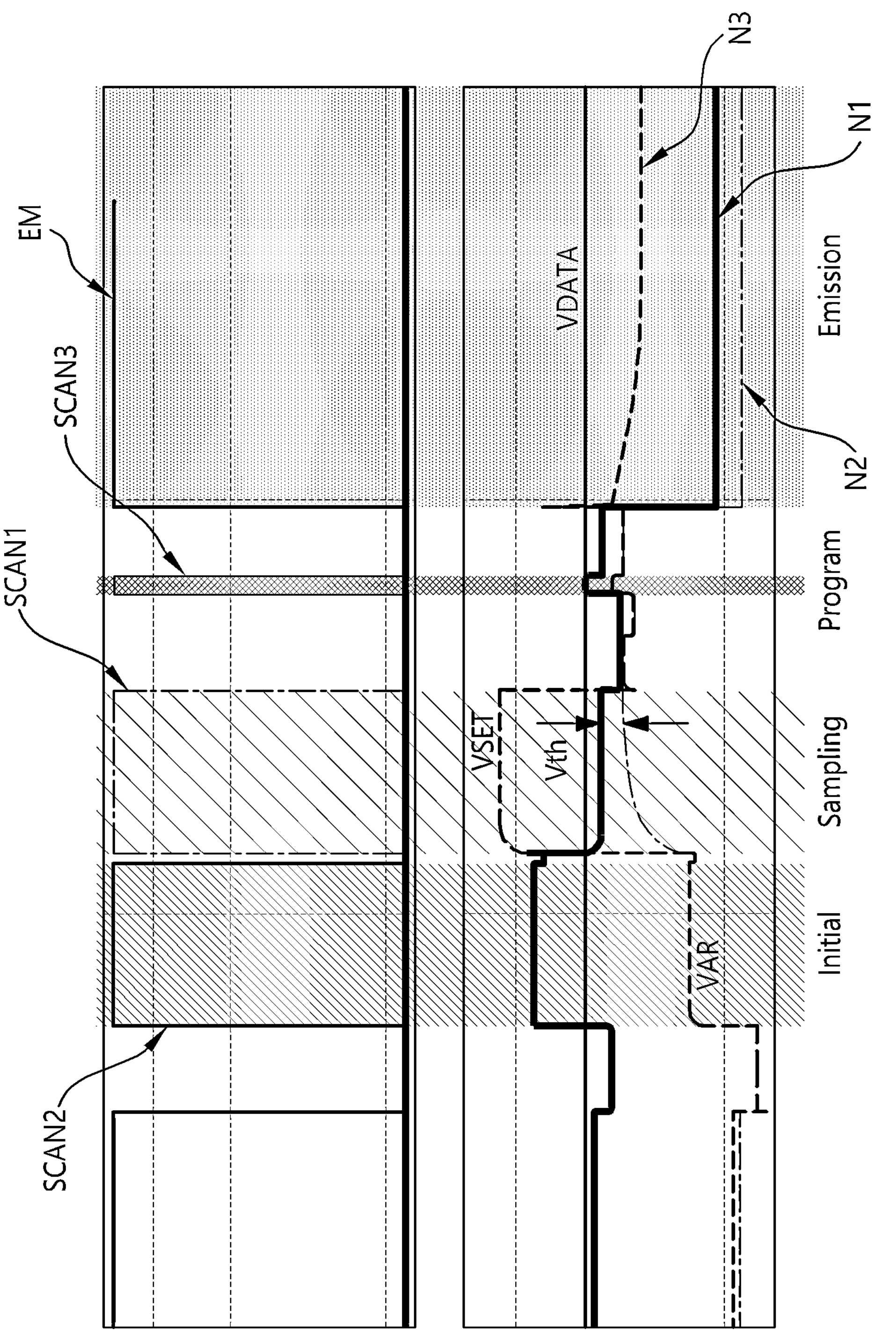
FIG. 8 is a diagram illustrating signal waveforms in nodes of the driving transistor depending on the driving timing of the subpixel according to another embodiment of the present disclosure.

FIG. 7 is a diagram illustrating the driving timing of the subpixel according to another embodiment of the present disclosure, and FIG. 8 is a diagram illustrating signal waveforms in nodes of the driving transistor depending on the driving timing of the subpixel according to another embodiment of the present disclosure.

Referring to FIGS. 7 and 8, the subpixels according to embodiments of the present disclosure can operate with an initialization period Initial, a sampling period Sampling, a programming period Program, and an emission period Emission.

The initialization period Initial is a period in which the data voltage supplied to the light emitting element ED is reset by supplying the reset voltage VAR to the subpixel SP. The sampling period Sampling is a period in which the threshold voltage of the driving transistor T2 is stored in the capacitor connected to the driving transistor T2. The programming period Program is a period in which the data voltage VDATA is stored in the capacitor connected to the driving transistor T2 by supplying the data voltage VDATA to the subpixel SP.

The emission period Emission is a period in which the data voltage VDATA are not supplied through the data lines connected to each of the light emitting elements ED, and the data voltage VDATA stored in the capacitor is used to emit the light emitting elements ED.

During the initialization period Initial, the second scan signal SCAN2 are supplied at a high level, so the seventh transistor T7 is turned on.

Accordingly, the second node N2 of the second transistor T2 corresponding to the driving transistor can be reset to the reset voltage VAR.

During the initialization period Initial, the emission signal EM, the first scan signal SCAN1, and the third scan signal SCAN3 are supplied at a low level, so the first transistor T1, the third transistor T3, the fourth transistor T4, the fifth transistor T5 and the sixth transistor T6 are turned off.

Therefore, the reset voltage VAR and low-potential base voltage VSS can be supplied to both ends of the auxiliary capacitor CA.

During the sampling period Sampling, the third scan signal SCAN3 is supplied at a high level, the second scan signal SCAN2 and the first scan signal SCAN1 are supplied at a low level.

Accordingly, the first node N1 of the second transistor T2 maintains the gate initialization voltage VINIT, and the third node N3 of the second transistor T2 receives the setting voltage VSET.

At this time, because the seventh transistor T7 is turned off, the second node N2 of the second transistor T2 can have a difference voltage (VINIT−Vth) corresponding to a difference between the gate initialization voltage VINIT and the threshold voltage Vth of the second transistor T2. Accordingly, the driving current flowing through the light emitting element ED by the second transistor T2 is not affected by the threshold voltage Vth. That is, compensation for the threshold voltage Vth of the second transistor T2 is accomplished.

In other words, during the sampling period Sampling, the subpixel performs a sampling operation to saturate the second transistor T2 to a certain level by increasing the voltage of the second node N2 of the second transistor T2, which is a driving transistor, in a source follower manner.

During the programming period Program, the third scan signal SCAN3 and the second scan signal SCAN2 are supplied at a low level, and the first scan signal SCAN1 is supplied at a high level.

Accordingly, the data voltage VDATA supplied to the first node N1 of the second transistor T2 is charged to the storage capacitor Cst and the auxiliary capacitor CA.

In addition, the difference voltage (VINIT−Vth) between the gate initialization voltage VINIT and the threshold voltage Vth of the second transistor T2 is added to the charged voltage a*(VDATA−VINIT) at the storage capacitor Cst in the second node N2 of the second transistor T2. (Here, a=Cst/(Cst+CA))

During the emission period Emission, the first scan signal SCAN1 to the third scan signal SCAN3 are maintained at a low level, and the emission signal EM is supplied at a high level.

Accordingly, the corresponding subpixel SP emits light by the driving current flowing from the high-potential driving voltage VDD to the low-potential base voltage VSS through the light emitting element ED.

At this time, since a low-potential base voltage VSS is supplied to the second node N2 of the second transistor T2 corresponding to the driving transistor during the emission period Emission, the second transistor T2 can have a stable state. As a result, the gate-source voltage of the second transistor T2 can be prevented from changing due to parasitic capacitance, and image defects such as crosstalk can be reduced.

The subpixel SP illustrated here is only an example, and can be modified in various ways by including or removing one or more transistors, and including or removing one or more capacitors.

Figure 9:
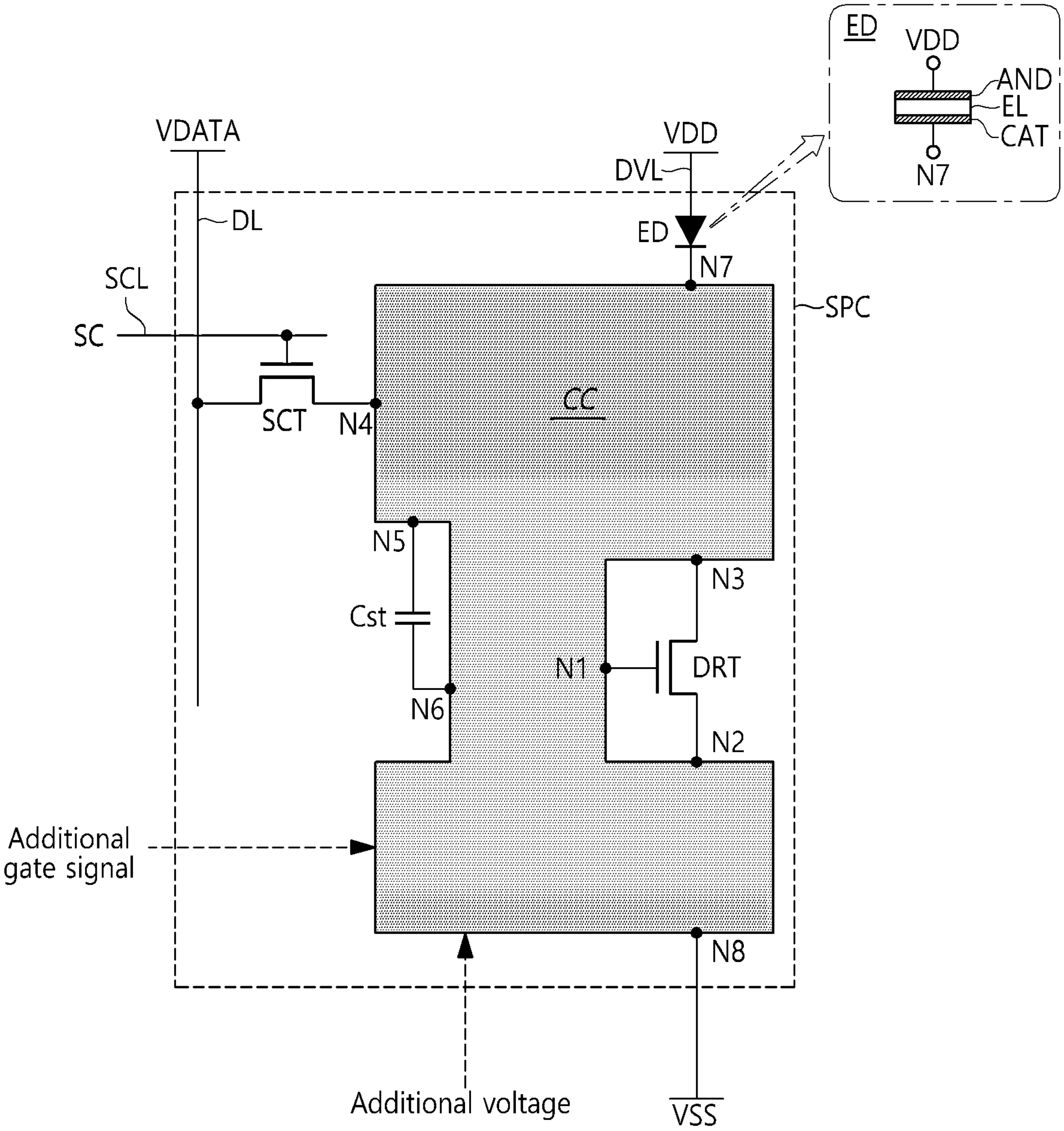
FIG. 9 illustrates a structure considering the possibility of deformation of a subpixel in a display device according to embodiments of the present disclosure.

FIG. 9 illustrates a structure considering the possibility of deformation of a subpixel in a display device according to embodiments of the present disclosure. However, descriptions of structures or components that are the same as those of the subpixel SP in FIG. 3 or FIG. 6 can be omitted or may be briefly provided.

Referring to FIG. 9, each of the plurality of subpixel circuits SPC disposed on the display panel 110 of the display device 100 according to embodiments of the disclosure can include a light emitting element ED and a plurality of circuit elements for driving the light emitting element ED.

Here, the light emitting element ED can be one of an organic light emitting diode (OLED), an inorganic light emitting diode (LED), and a quantum dot light emitting element.

The circuit elements constituting the subpixel circuit SPC can basically include a driving transistor DRT, a scan transistor SCT, and a storage capacitor Cst, and can further include a control circuit CC including one or more transistors and/or one or more capacitors.

The subpixel circuit SPC can be connected to a data line DL that supplies the data voltage VDATA and a scan signal line SCL that supplies the scan signal SC.

The subpixel circuit SPC can receive the high-potential driving voltage EVDD through the driving voltage line DVL, and receive a low-potential base voltage EVSS that is lower than the high-potential driving voltage VDD.

The subpixel circuit SPC can further receive one or more additional voltages depending on the circuit configuration of the control circuit CC.

The subpixel circuit SPC can further receive one or more additional gate signals depending on the circuit configuration of the control circuit CC. For example, the additional gate signals can include scan signals and/or emission signals.

The driving transistor DRT is a transistor for driving the light emitting element ED, and can include a first node N1, a second node N2, and a third node N3. The first node N1 of the driving transistor DRT can be the gate node of the driving transistor DRT. The second node N2 of the driving transistor DRT can be a source node or drain node of the driving transistor DRT. The third node N3 of the driving transistor DRT can be the drain node or the source node of the driving transistor DRT, and have a high-potential driving voltage VDD applied thereto.

The scan transistor SCT can be connected between the data line DL and the control circuit CC. The gate node of the scan transistor SCT can be electrically connected to the scan line SCL for supplying the scan signal SC, and the drain node or source node of the scan transistor SCT can be electrically connected to the data line DL.

The source node or drain node of the scan transistor SCT can be electrically connected to the fourth node N4 of the control circuit CC. For example, the fourth node N4 of the control circuit CC can be electrically connected to one of the first node N1, the second node N2, and the third node N3 of the driving transistor DRT or can be electrically connected to one of both ends of the storage capacitor Cst.

The both ends of the storage capacitor Cst can be connected to the fifth node N5 and sixth node N6, respectively, of the control circuit CC. One of the fifth node N5 and the sixth node N6 of the control circuit CC can be electrically connected to the first node N1 of the driving transistor DRT.

The driving voltage line DVL can be electrically connected to the light emitting element ED The light emitting element ED can be electrically connected to the seventh node N7 of the control circuit CC. The light emitting element ED can include an anode electrode AND, a light emitting layer EL, and a cathode electrode CAT. For example, the anode electrode AND can receive the high-potential driving voltage VDD. The cathode electrode CAT can be electrically connected to the seventh node N7 of the control circuit CC.

Each of the driving transistor DRT and the scan transistor SCT can be an N-type transistor or a P-type transistor. One or more transistors included in the control circuit CC can also be an N-type transistor or a P-type transistor.

Meanwhile, the subpixel circuit SPC may, or may not, include the control circuit CC. Although the subpixel circuit SPC includes the control circuit CC, the control circuit CC can have various circuit configurations. Here, the various circuit configurations can include the number and connection structure of the transistors and the number and connection structure of the capacitors.

For example, the presence or absence or the circuit configuration of the control circuit CC can be varied depending on, c.g., the size (e.g., large, medium, or small) of the display device 100, the type (e.g., television, monitor, smartphone/tablet) of the display device 100, driving scheme, or provided functions.

When the subpixel circuit SPC does not include the control circuit CC, the subpixel circuit SPC can have the most basic circuit configuration including a light emitting element ED, two transistors DRT, SCT and one capacitor Cst. In this case, the seventh node N7 and the third node N3 can be electrically connected, the fourth node N4, the fifth node N5, and the first node N1 can be electrically connected, and the sixth node N6, the eighth node N8, and the second node N2 can be electrically connected.

The above-described embodiments of the present disclosure will be briefly reviewed or discussed as follows.

A subpixel circuit of the disclosure can include a light emitting element configured to receive a high-potential driving voltage at an anode electrode, a driving transistor including a first node, a second node, and a third node, a scan transistor controlled by a first scan signal and transmitting a data voltage through a data line, a storage capacitor, and a control circuit configured to control operations of the driving transistor, the scan transistor, and the storage capacitor and located between a cathode electrode of the light emitting element and a low-potential base voltage.

The cathode electrode of the light emitting clement is electrically connected to the third node of the driving transistor through the control circuit.

The driving transistor has the first node as a gate node and the second node which receives the low-potential base voltage through the control circuit. The driving transistor is made of an N-type oxide semiconductor.

The control circuit can include a first light emitting transistor controlled by an emission signal and electrically connected between the cathode electrode of the light emitting element and the driving transistor, a second light emitting transistor controlled by the emission signal and electrically connected to the second node and a node to which the low-potential base voltage is supplied, a reset transistor controlled by a second scan signal and electrically connected between a node to which a reset voltage is supplied and the second node, an initialization transistor controlled by a third scan signal and electrically connected between a node to which a gate initialization voltage is supplied and the first node, a setting transistor controlled by a fourth scan signal and electrically connected between a node to which a setting voltage is supplied and the third node, and an auxiliary capacitor connected between the second node and a node to which the low-potential base voltage is supplied.

The second scan signal is a same signal having a different phase from the fourth scan signal.

The subpixel circuit can operating in an initialization period for resetting the light emitting clement by the reset voltage, a sampling period for storing a threshold voltage of the driving transistor in the storage capacitor and the auxiliary capacitor, a programming period for storing the data voltage in the storage capacitor and the auxiliary capacitor, and an emission period for emitting the light emitting element by the data voltage stored in the storage capacitor and the auxiliary capacitor.

The control circuit can include a first light emitting transistor controlled by an emission signal and electrically connected between the cathode electrode of the light emitting element and the driving transistor, a second light emitting transistor controlled by the emission signal and electrically connected to the second node and a node to which the low-potential base voltage is supplied, a reset transistor controlled by a second scan signal and electrically connected between a node to which a reset voltage is supplied and the second node, an initialization transistor controlled by a third scan signal and electrically connected between a node to which a gate initialization voltage is supplied and the first node, a setting transistor controlled by the third scan signal and electrically connected between a node to which a setting voltage is supplied and the third node, and an auxiliary capacitor connected between the second node and a node to which the low-potential base voltage is supplied.

The second scan signal is a same signal with a different phase from the third scan signal.

The subpixel circuit can operate in an initialization period for resetting the light emitting clement by the reset voltage, a sampling period for storing a threshold voltage of the driving transistor in the storage capacitor and the auxiliary capacitor, a programming period for storing the data voltage in the storage capacitor and the auxiliary capacitor, and an emission period for emitting the light emitting element by the data voltage stored in the storage capacitor and the auxiliary capacitor.

A display panel of the disclosure can include a subpixel circuit comprising a light emitting element configured to receive a high-potential driving voltage at an anode electrode, a driving transistor including a first node, a second node, and a third node, a scan transistor controlled by a first scan signal and transmitting a data voltage through a data line, a storage capacitor, and a control circuit configured to control operations of the driving transistor, the scan transistor, and the storage capacitor and located between a cathode electrode of the light emitting element and a low-potential base voltage line.

A display device of the disclosure can include a display panel including a plurality of subpixels, a gate driving circuit configured to supply a plurality of gate signals to the display panel through a plurality of gate lines, a data driving circuit configured to supply a plurality of data voltages to the display panel through a plurality of data lines, and a timing controller configured to control the gate driving circuit and the data driving circuit, wherein each of the plurality of subpixels includes a light emitting element configured to receive a high-potential driving voltage at an anode electrode, a driving transistor including a first node, a second node, and a third node, a scan transistor controlled by a first scan signal and transmitting a data voltage through a data line, a storage capacitor, and a control circuit configured to control operations of the driving transistor, the scan transistor, and the storage capacitor and located between a cathode electrode of the light emitting element and a low-potential base voltage line.

The above description has been presented to enable any person skilled in the art to make and use the technical idea of the present invention, and has been provided in the context of a particular application and its requirements. Various modifications, additions and substitutions to the described embodiments will be readily apparent to those skilled in the art, and the general principles defined herein can be applied to other embodiments and applications without departing from the spirit and scope of the present invention. The above description and the accompanying drawings provide an example of the technical idea of the present invention for illustrative purposes only. That is, the disclosed embodiments are intended to illustrate the scope of the technical idea of the present invention.

What is claimed is:

1. A subpixel circuit comprising:

a light emitting element configured to receive a high-potential driving voltage at an anode electrode;

a driving transistor including a first node, a second node, and a third node;

a scan transistor controlled by a first scan signal and configured to transmit a data voltage through a data line;

a storage capacitor, and a control circuit configured to control operations of the driving transistor, the scan transistor, and the storage capacitor, and located between a cathode electrode of the light emitting element and a low-potential base voltage line for providing a low-potential base voltage, wherein the control circuit includes:

a first light emitting transistor controlled by an emission signal, and electrically connected between the cathode electrode of the light emitting element and the driving transistor, a second light emitting transistor controlled by the emission signal, and electrically connected to the second node and a node to which the low-potential base voltage is supplied;

a reset transistor controlled by a second scan signal, and electrically connected between a node to which a reset voltage is supplied and the second node;

an initialization transistor controlled by a third scan signal, and electrically connected between a node to which a gate initialization voltage is supplied and the first node;

a setting transistor controlled by a fourth scan signal, and electrically connected between a node to which a setting voltage is supplied and the third node; and an auxiliary capacitor connected between the second node and a node to which the low-potential base voltage is supplied, and wherein the second scan signal is a same signal with a different phase from the fourth scan signal.

2. The subpixel circuit according to claim 1, wherein the cathode electrode of the light emitting element is electrically connected to the third node of the driving transistor through the control circuit.

3. The subpixel circuit according to claim 1, wherein the driving transistor has the first node as a gate node, and the second node which receives the low-potential base voltage through the control circuit.

4. The subpixel circuit according to claim 1, wherein the driving transistor includes an N-type oxide semiconductor.

5. The subpixel circuit according to claim 4, the driving transistor includes a channel formed from at least one of indium, gallium, zinc oxide, or IGZO.

6. The subpixel circuit according to claim 1, wherein the subpixel circuit operates in:

an initialization period for resetting the light emitting element by the reset voltage;

a sampling period for storing a threshold voltage of the driving transistor in the storage capacitor and the auxiliary capacitor, a programming period for storing the data voltage in the storage capacitor and the auxiliary capacitor; and an emission period for emitting the light emitting element by the data voltage stored in the storage capacitor and the auxiliary capacitor.

7. The subpixel circuit according to claim 6, wherein the data voltage is not supplied through the data lines connected to each of the light emitting elements in the emission period.

8. The subpixel circuit according to claim 1, wherein the driving transistor includes a P-type oxide semiconductor.

9. The subpixel circuit according to claim 8, wherein the driving transistor includes a low-temperature poly-silicon channel.

10. The subpixel circuit according to claim 1, wherein the light emitting element includes an organic light emitting diode.

11. The subpixel circuit according to claim 1, wherein the light emitting element includes a light emitting layer between the anode electrode and the cathode electrode.

12. A display panel comprising a subpixel circuit including:

a light emitting element configured to receive a high-potential driving voltage at an anode electrode;

a driving transistor including a first node, a second node, and a third node;

a scan transistor controlled by a first scan signal and configured to transmit a data voltage through a data line;

a storage capacitor, and a control circuit configured to control operations of the driving transistor, the scan transistor, and the storage capacitor, and located between a cathode electrode of the light emitting element and a low-potential base voltage line for providing a low-potential base voltage, wherein the control circuit includes:

a first light emitting transistor controlled by an emission signal, and electrically connected between the cathode electrode of the light emitting element and the driving transistor, a second light emitting transistor controlled by the emission signal, and electrically connected to the second node and a node to which the low-potential base voltage is supplied;

a reset transistor controlled by a second scan signal, and electrically connected between a node to which a reset voltage is supplied and the second node;

an initialization transistor controlled by a third scan signal, and electrically connected between a node to which a gate initialization voltage is supplied and the first node;

a setting transistor controlled by the third scan signal, and electrically connected between a node to which a setting voltage is supplied and the third node; and an auxiliary capacitor connected between the second node and a node to which the low-potential base voltage is supplied, and wherein the second scan signal is a same signal with a different phase from the third scan signal.

13. A display device comprising:

a display panel including a plurality of subpixels;

a gate driving circuit configured to supply a plurality of gate signals to the display panel through a plurality of gate lines;

a data driving circuit configured to supply a plurality of data voltages to the display panel through a plurality of data lines; and a timing controller configured to control the gate driving circuit and the data driving circuit, wherein each of the plurality of subpixels includes:

a light emitting element configured to receive a high-potential driving voltage at an anode electrode;

a driving transistor including a first node, a second node, and a third node;

a scan transistor controlled by a first scan signal, and configured to transmit a data voltage through a corresponding one of the plurality of data lines;

a storage capacitor, and a control circuit configured to control operations of the driving transistor, the scan transistor, and the storage capacitor, and located between a cathode electrode of the light emitting element and a low-potential base voltage line, wherein the control circuit includes:

a first light emitting transistor controlled by an emission signal, and electrically connected between the cathode electrode of the light emitting element and the driving transistor;

a second light emitting transistor controlled by the emission signal, and electrically connected to the second node and a node to which the low-potential base voltage is supplied;

a reset transistor controlled by a second scan signal, and electrically connected between a node to which a reset voltage is supplied and the second node;

an initialization transistor controlled by a third scan signal, and electrically connected between a node to which a gate initialization voltage is supplied and the first node;

a setting transistor controlled by a fourth scan signal, and electrically connected between a node to which a setting voltage is supplied and the third node; and an auxiliary capacitor connected between the second node and a node to which the low-potential base voltage is supplied, and wherein the second scan signal is a same signal with a different phase from the fourth scan signal.

* * * * *